United States Patent [19]

Matsubara et al.

[11] Patent Number: 4,819,342
[45] Date of Patent: Apr. 11, 1989

[54] WATER ABSORPTION CONTROLLED DEHYDRATING DEVICE

[75] Inventors: Mamoru Matsubara; Masami Takuno, both of Yokohama, Japan

[73] Assignee: Showa Denko Kabushiki Kaisha, Tokyo, Japan

[21] Appl. No.: 139,534

[22] Filed: Dec. 30, 1987

[30] Foreign Application Priority Data

Nov. 18, 1987 [JP] Japan .................................. 62-289270

[51] Int. Cl.$^4$ ............................................. F26B 13/26
[52] U.S. Cl. ............................................. 34/95; 34/9; 210/502.1; 426/124
[58] Field of Search ............... 34/9, 95; 426/443, 124; 210/500.21, 502.1, 650

[56] References Cited

U.S. PATENT DOCUMENTS

| | | | |
|---|---|---|---|
| 4,124,116 | 11/1978 | McCabe, Jr. | 34/95 X |
| 4,383,376 | 5/1983 | Numamoto et al. | 34/9 |
| 4,686,776 | 8/1987 | Matsubara | 34/9 X |

Primary Examiner—Steven E. Warner
Attorney, Agent, or Firm—Sughrue, Mion, Zinn, Macpeak & Seas

[57] ABSTRACT

A water absorption controlled dehydrating device which comprises covering a high osmotic pressure substance and a water soluble thickening agent with a supporting material provided at least partly with a water-permeable semipermeable membrane.

10 Claims, 6 Drawing Sheets

WATER ABSORPTION CONTROLLED DEHYDRATING DEVICE

BACKGROUND OF THE INVENTION

1. Field of the Invention

The present invention relates to a dehydrating device with controlled water absorption. More particularly, it relates mainly to a sheet for causing dehydration by contact with a food; the sheet able to be applied in a variety of fields such as a pretreatment of, for example, drying or freezing fish, meat, vegetable or the like, food preservation, food processing, cooking etc.

2. Description of the Related Art

A variety of contact dehydrating sheets which comprise a combination of a semipermeable membrane and a high osmotic pressure substance, and utilize a difference in osmotic pressure, are proposed, for example, in Japanese Examined Patent Publication No. 58124/83, and U.S. Pat. Nos. 4,383,376, 3,645,698 and 4,686,776. All of these devices contain a polymeric water absorber therein, and thus the high osmotic pressure substance absorbs water through the semipermeable membrane, and the water moves from the high osmotic pressure substance to the polymeric water absorber and is fixed therein. The polymeric water absorber has a high water absorbing capacity of as much as several tens of times to several hundreds of times its weight when empty, and can maintain the water absorbing function for a long period; that is, can retain a high osmotic pressure, and show a high water absorbing capacity.

Conventional dehydrating sheets containing a polymeric water absorber, have a long term retention of water absorbing function, and thus may be often inconvenient, depending on the intended use. In other words, to control the water absorption to an appropriate level, it is necessary to remove the dehydrating sheet at the proper time.

A dehydrating sheet is required which, upon having absorbed a desired amount of water, will absorb substantially no more water because of a reduction of dehydrating capacity, and thus need not be removed. In addition, the water absorbing function of a polymeric water absorber will be greatly reduced when absorbing water in which ionic substances such as $Ca^{++}$, $Mg^{++}$, $Na^+$, $K^+$, $Cl^-$ and the like coexist. Accordingly, the water absorbing function can be varied depending on the purpose therefor, and it may be difficult to control the dehydration.

SUMMARY OF THE INVENTION

A dehydrating sheet in which the dehydrating function is reduced after a certain amount of water has been absorbed, and will not be affected by ionic substances is required from the aspect of intended use. Thus, an object of the present invention is to provide a dehydrating device which can satisfy such requirements.

The object of the present invention is accomplished by the dehydrating device of the present invention having the following construction. That is, the dehydrating device of the present invention comprises a high osmotic pressure substance and a water soluble thickening agent covered with a supporting material provided at least partly with a water-permeable semipermeable membrane.

DESCRIPTION OF THE PREFERRED EMBODIMENTS

The hardness and flexibility of sheets comprising a high osmotic pressure substance and inserted between semipermeable membranes change, depending on the water content of the high osmotic pressure substance.

The change of hardness and flexibility of a sheet is due to a large extent to the migration of water from a food into the sheet, and the change in the water content causes problems in practical use. That is, if the sheet is used in the form of a hard plate before use, the contact thereof with a food is unsatisfactory, and thus cannot properly exhibit the desired function. If the sheet containing absorbed water is soft and has no shape retention, it will be difficult to remove the sheet and the food is apt to be polluted due to damage to the sheet.

The dehydrating device of the present invention can absorb water while maintaining the appropriate flexibility and shape retention of the sheet, so that only the osmotic pressure of the sheet is reduced to the same level as that of the food, and dehydration is substantially stopped. The use of the polymeric water absorber is effective for maintaining the flexibility and shape retention of the sheet, but the absorbed water is likely to migrate to the water absorber, so that the water absorbing function is maintained for an extended time and the water absorption becomes excessive. The purpose of the present invention is to solve the above defect of the co-existence of a polymeric water absorber, on the basis of a special finding that the above problems are largely improved by using it together with a water soluble thickening agent and a high osmotic pressure substance.

The water soluble thickening agent has a property such that an addition thereof in only a small amount will effectively thicken and maintain a constant viscosity even if the water content varies extensively. Also, the water soluble thickening agent has a larger molecular weight than the high osmotic pressure substance, and thus a low osmotic pressure, so that it may be added in a small amount and the effect thereof on the osmotic pressure may be neglected.

Figure 1:
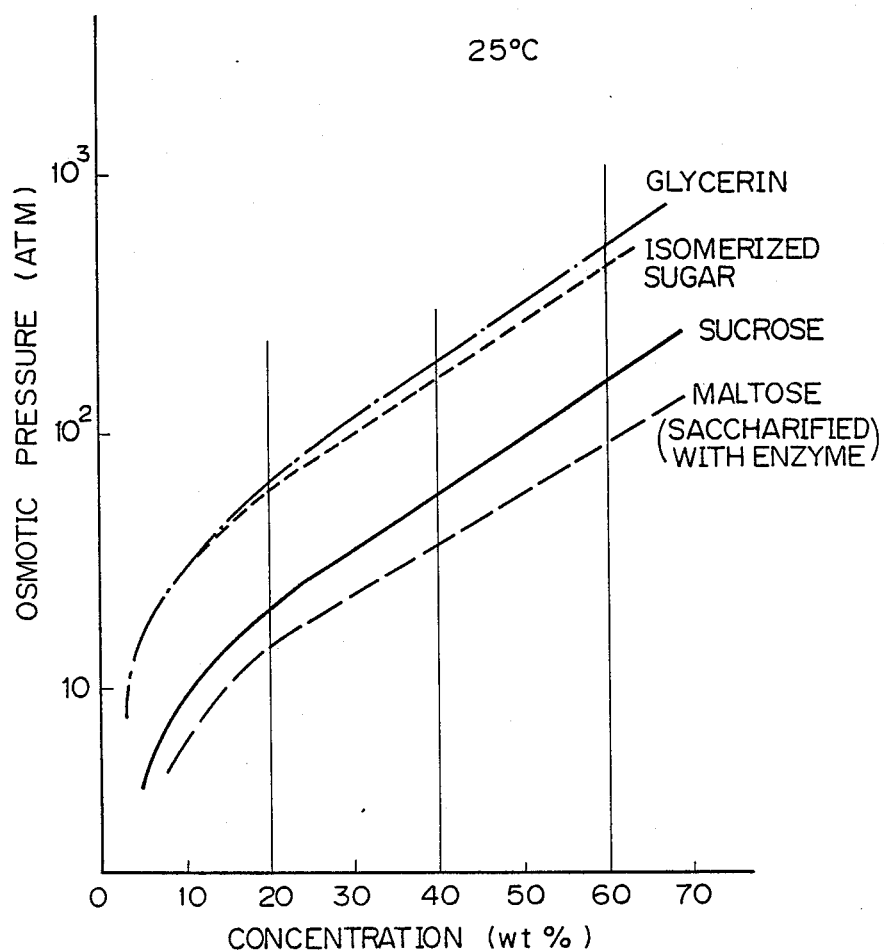
FIG. 1 is a graph illustrating an example of the relationship of the concentration of an aqueous solution of a high osmotic pressure substance and the osmotic pressure.

Accordingly, in the dehydrating device of the present invention, the osmotic pressure in relation to the dehydration of a food is determined by the concentration of a high osmotic pressure substance. As shown in FIG. 1, it is possible to freely select an optional osmotic pressure by changing the concentration of the high osmotic pressure substance.

The practical mixing ratio of the high osmotic pressure substance and the water soluble thickening agent is preferably in the range of from about 100:0.5 to 100:5.

Ordinary foods exhibit an osmotic pressure in the range of from several kg/cm$^2$ to about 10 kg/cm$^2$, and thus dehydration will increase the concentrations of soluble components in the foods such is inorganic salts, amino acids, sugars and the like, as well as the osmotic pressure. On the other hand, in the dehydrating sheet containing absorbed water, the osmotic pressure is reduced from the initial osmotic pressure (taken from the concentration-osmotic pressure curve of FIG. 1) by absorbing water, and finally, reaches a balance with the osmotic pressure of the food to stop dehydration.

As the water-permeable semipermeable membrane useful for the present invention, there are preferably mentioned water-permeable membranes such as ordinary cellophane, a low oriented vinylon film, a collodion membrane, an ethylene-vinyl acetate copolymer film, a low oriented nylon film and the like. Among them, the vinylon film used for packaging foods can be used advantageously.

As the high osmotic pressure substances, there are mentioned aqueous solutions of edible saccharides such as thick malt syrup, sucrose, isomerized sugars, pullulan, glucose, fructose, mannitol, sorbitol, margetol and the like and compounds such as glycerin, propylene glycol and the like. Particularly, aqueous solutions of the edible saccharides having a molecular weight of several tens to several hundreds are preferred for use of the present invention.

As the water soluble thickening agent, there may be used natural polysaccharides and their derivatives such as alginic acid, sodium alginate, an alginic acid-propylene glycol ester, mannan, starch, a starch-sodium phosphate, carrageenan, gluten, guar gum, gum arabic, tragacanth gum, locust bean gum, starch-sodium glycolate, cellulose-sodium glycolate and the like; natural proteins such as casein, sodium casein and the like; and synthetic polymers such as sodium polyacrylate, methyl cellulose, sodium carboxymethyl cellulose, polyvinyl alcohol, polyethylene oxide, carboxymethyl cellulose and the like. These are linear long chain polymeric compounds having a molecular weight of several thousands to several tens of thousands which are water soluble and show a thickening effect, and may be used alone or as a mixture of two or more thereof. These water soluble thickening agents exhibit little osmotic pressure, and thus have little effect on the dehydration promoting force of the dehydrating device.

The amount of the high osmotic pressure substance contained in the dehydrating device and the ratio of the water soluble thickening agent to be added may be varied appropriately depending on the sort of food and the desired dehydration amount.

In the dehydrating device of the present invention, a humidifier may be added such as a hydrophilic alcohol such as glycerin, propylene glycol or the like in addition to the above-mentioned high osmotic pressure substance and the water soluble thickening agent to prevent excessive drying of the device during storage or in use. Thus, the addition of the alcohol is effective for maintaining the flexibility of the device at a certain level. Furthermore, it is also effective from the standpoint of hygienic control to incorporate a substance having a bacteriostatic effect such as ethanol, egg albumen lysozyme, an amino acid, an organic acid or the like.

Figure 2:
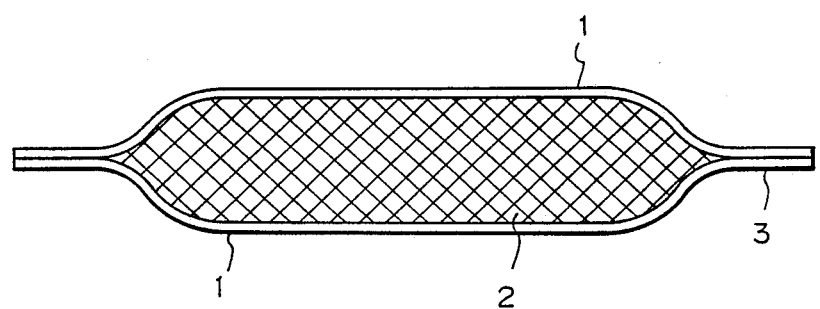
FIG. 2 is a schematic view illustrating an example of the dehydrating device of the present invention.

An example of the dehydrating device in the form of sheet according to the present invention is illustrated schematically in FIG. 2. The surface of the sheet is covered with the water-permeable semipermeable membrane 1, and the interior of the sheet contains the high osmotic pressure substance and the water soluble thickening agent 2. A humidifier and a bacteriostatic agent may be further incorporated thereto.

At the semipermeable membrane on the surface, water, ammonia and amines may freely permeate but not amino acids, nucleic acids and sugars may not freely permeate so that it is convenient for the dehydration of foods.

The hardness of the interior of the sheet varies depending on the conditions of use, and generally, is in the viscosity range of 100–500 poises. If the sheet is harder than 500 poise, it will not adhere successfully to food. If it is softer than 100 poise, migration within the sheet occurs to cause an unevenness of the thickness, so that dehydration will be non-uniform.

As described above, in the device of the present invention, water absorption is substantially stopped in a certain water absorption level, so that excessive dehydration from the food is prevented. On the other hand, in the conventional dehydrating device containing a polymeric water absorber, although water is absorbed in the high osmotic pressure substance and retained, it is then absorbed into the polymeric water absorber. As the polymeric water absorber has a high water absorption capacity, water migrates continuously from the high osmotic pressure substance to the polymeric water absorber, so that the osmotic pressure of the high osmotic pressure substance is maintained at a high level and water absorption is continued.

Figure 3:
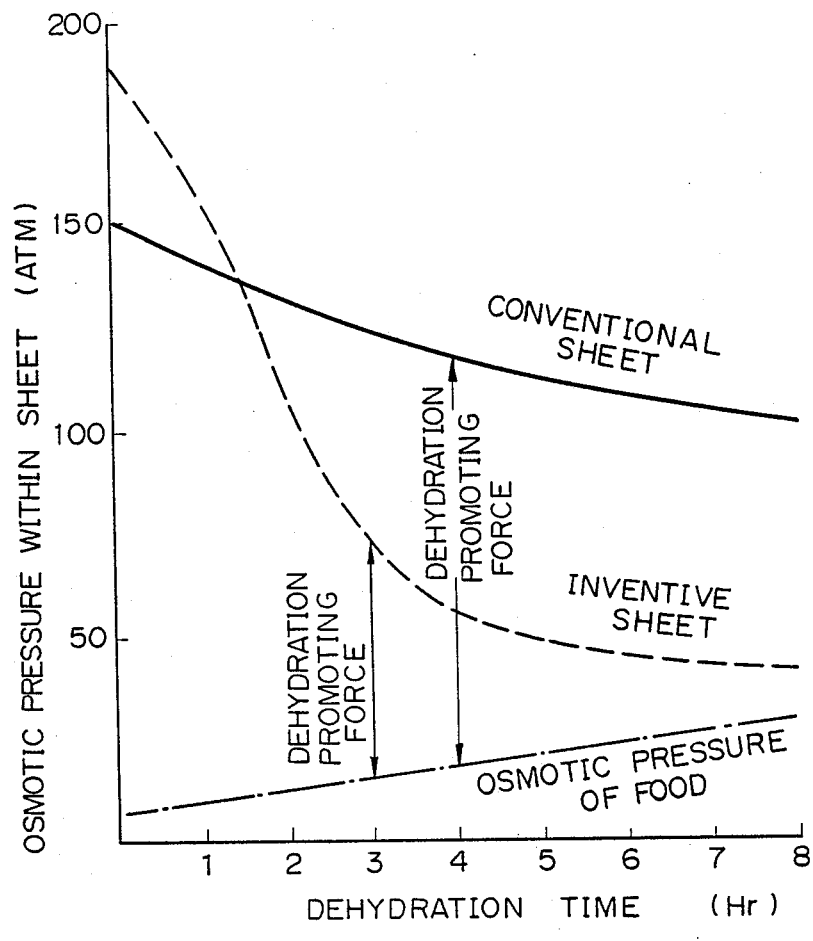
FIG. 3 is a graph showing an example of the variation of water absorbing force of the dehydrating sheet.

FIG. 3 is a graph illustrating the variation of the water absorbing force of the dehydrating device according to the present invention and the conventional dehydrating device containing a polymeric water absorber, both of which devices are constructed in the form of sheet. The above description can be clearly understood from FIG. 3.

The dehydrating sheet of the present invention may be freely selected according to the kind of food and the desired dehydration level.

That is, absorption rate is determined by the kind and concentration of a high osmotic pressure substance (level of osmotic pressure), flexibility of the sheet and the resistance of a semipermeable membrane (thickness of the membrane). The amount of water absorption is controlled by the concentration of a high osmotic pressure substance and the content thereof within the sheet (thickness of the sheet). Flexibility and shape retention significant to the handling properties of a sheet are determined by the amount added of the water soluble thickening agent.

As is apparent from the above, it is possible to easily make dehydrating sheets suitable for use by changing the kind, concentration and amount of a high osmotic pressure substance and the amount added of a water soluble thickening agent.

The property of the dehydrating sheet whereby water absorption is substantially stopped after having absorbed a predetermined amount of water, does not restrict the time for packaging a food into the sheet, and thus it can be further used as a packaging material for transport and the like.

The present invention will be further explained below with reference to Examples.

EXAMPLE 1

A thick malt syrup (maltose manufactured by Sanmatsu Kogyo Kabushiki Kaisha; Himal-38) was used as a high osmotic pressure substance, and sodium alginate as a water soluble thickening agent, propylene glycol as a humidifier and ethanol as a bacteriostatic agent were added to the high osmotic pressure substance in a variety of ratios to make mixtures. The relationship of the concentrations of respective components of these mixtures, and the viscosities thereof, is shown in FIG. 4.

Figure 4:
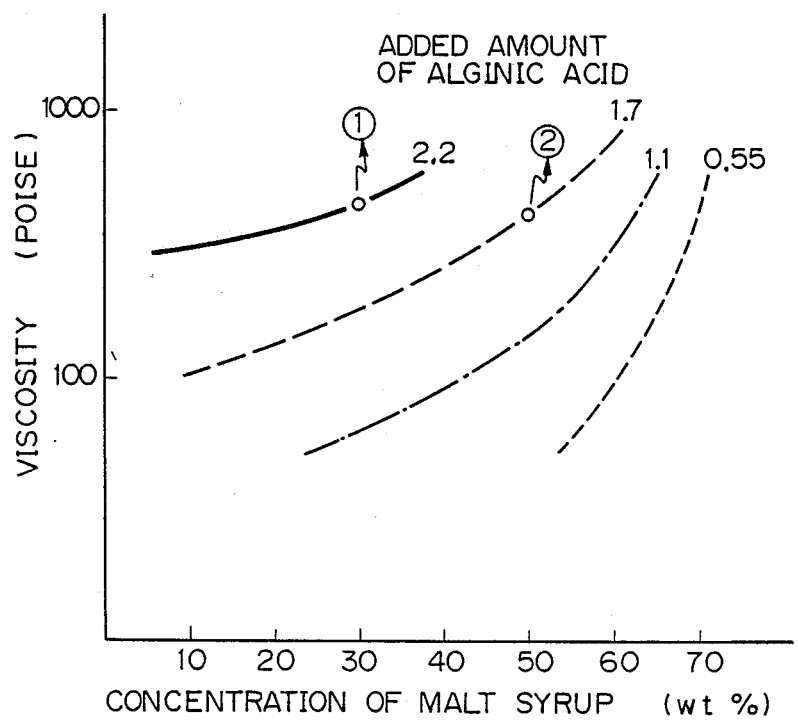
FIG. 4 is a graph showing the effect of a water soluble thickening agent on the viscosity of a high osmotic pressure substance; and, FIGS. 5 and 6 are graphs showing the result of the dehydration tests of the sheets produced in Examples, respectively.

As is apparent from FIG. 4, the thick malt syrup was diluted to a concentration such that the desired osmotic pressure will be obtained, and then sodium alginate was added thereto to ensure a suitable viscosity for the sheet.

For example, the mixture 1 in FIG. 4 has the physical properties before use of an osmotic pressure of 24 atm. and a hardness of 450 poise, and the mixture 2 has the physical properties before use of an osmotic pressure of 60 atm. and a hardness of 400 poise, both of these mixtures showed preferred properties.

EXAMPLE 2

Dehydrating sheets were made by using the mixtures of components 1 and 2 of Example 1 respectively. Preparation of the sheets was conducted by mixing predetermined amounts of the maltose, sodium alginate, propylene glycol and ethanol homogeneously, placing the mixture in a vinylon film pouch having three sides sealed, uniformly stretching the pouch while forcing air out of the opening to ensure a certain thickness level, and then heat-sealing the opening. The water-permeable semipermeable membrane used was a vinylon film (manufactured by Tokyo Cellophane Paper Kabushiki Kaisha; LH-25), and the sheet had an average thickness of 0.6 mm.

An opened saurel was used as a sample and dehydrating treatment was carried out with each of these sheets (at a temperature of 3–5° C.). The relationship of the dehydration rate and time is shown in FIG. 5.

Figure 5:
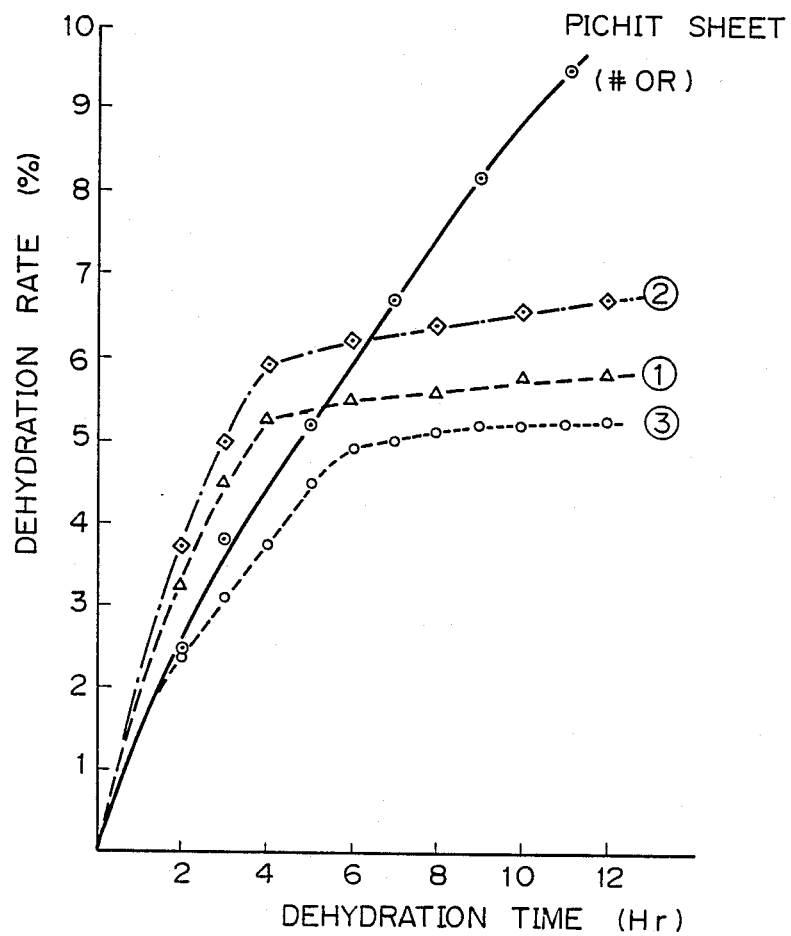

FIG. 5 shows that a Pichit Sheet, (trade name, #OR; manufactured by Showa Denko Kabushiki Kaisha) which used a polymeric water absorber exhibited a prolonged water-absorbing function, but the water absorbing function of the sheet of the present invention was reduced after having absorbed a certain amount of water, to substantially stop water absorption. Thus, the water absorption properties of these two sheets are remarkably distinguished.

EXAMPLE 3

A 75% thick malt syrup (Himal-38) and sodium polyacrylate (manufactured by Showa Denko Kabushiki Kaisha; Viscomate F-480S) were mixed in a ratio of 100:2, and the mixture was stretched to a thickness of 0.3 mm and was sandwiched between vinylon films (LH-25) to make a dehydrating sheet.

When the sheet was dipped into a 10% sucrose aqueous solution (at an osmotic pressure of 10 atm.) to evaluate the water absorption capacity, weight increase of 3.4 g/dm$^2$.hr occurred. When dehydrating test was conducted with an opened saurel, the result shown in FIG. 5 was obtained. The sheet showed hardness on use and water absorption capacity properties well suited for a dehydrating sheet.

EXAMPLE 4

A 66.7 parts of isomerized sugar solution (manufactured by Sanmatsu Kogyo Kabushiki Kaisha; Sanfruct-550, 75% aqueous solution), 33.3 parts of water, 2.2 parts of methyl cellulose (manufactured by Shinetsu Kagaku Kogyo Kabushiki Kaisha; Metolose) and 4.4 parts of glycerin (first grade reagent) were mixed homogeneously. The mixed solution had a viscosity of 230 poise (measured at 20° C. with a B type viscometer) and an osmotic pressure of 300 atoms. (calculated). Hundred gram and fifty gram samples of the above-mentioned mixture were respectively coated on a vinylon film (manufactured by Tokyo Cellophane Paper Kabushiki Kaisha; LH-18) over an area of 50×30 cm, then the same vinylon film was layered thereon, air between the films was completed expelled, and finally, the four side edges of the films were heat-sealed.

Figure 6:
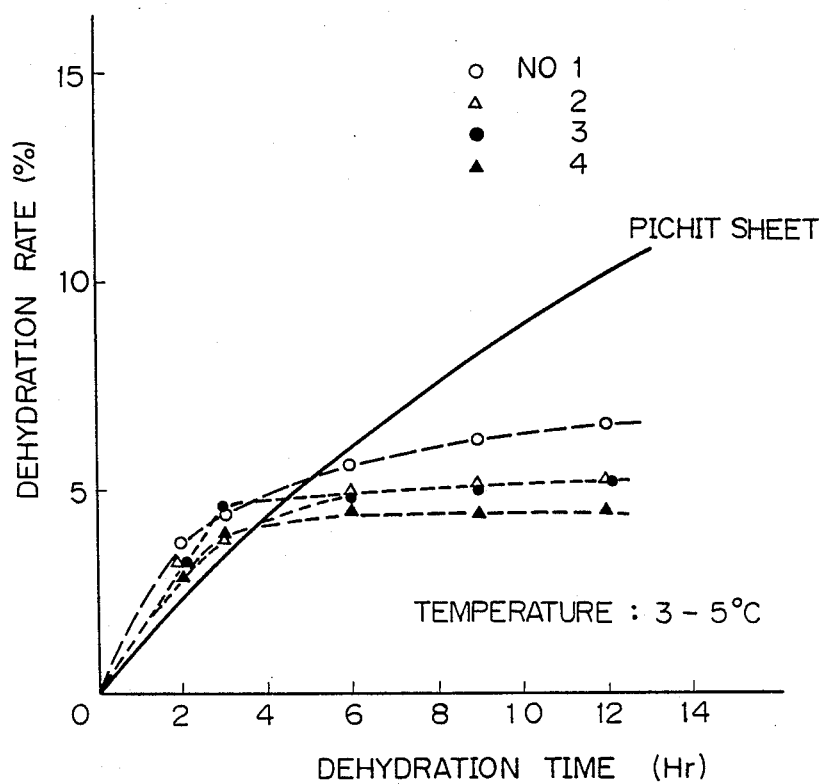

The sheet having coated thereon 100 g of the mixture had an average thickness of about 0.6 mm, was white and, flexible, and had an excellent dehydrating effect. The test results are shown in FIG. 6 - No. 1.

The sheet having coated thereon 50 g of the mixture had an average thickness of about 0.4 mm. Both the appearance and flexibility were good (FIG. 6 - No. 2).

All of these sheets had a high utility, and thus were good dehydrating sheets.

EXAMPLE 5

A 30 parts sample of an anhydrous fructose (manufactured by Sanmatsu Kogyo Kabushiki Kaisha; anhydrous fructose), 70 parts of water, 2.5 parts of alginic acid-propylene glycol ester (reagent) and 4.4 parts of glycerin were mixed together to make a dehydrating sheet in the same way as in Example 4. The osmotic pressure was 110 atom (calculated).

The sheet had a good appearance and function upon coating the mixture of 100 g (in a thickness of 0.6 mm) and 50 g (in a thickness of 0.4 mm), respectively.

The results of the practical dehydrating test are shown in FIG. 6. In FIG. 6, No. 3 shows the case of coating 100 g of the mixture and No. 5 shows the case of coating 50 g of the mixture. The result with a Pichit Sheet (trade name, manufactured by Showa Denko Kabushiki Kaisha; #OR) is shown comparatively.

We claim:

1. A water absorption controlled dehydrating device which comprises covering a high osmotic pressure substance and a water soluble thickening agent with a supporting material provided at least partly with a water-permeable semipermeable membrane.

2. A device as set forth in claim 1, wherein the weight ratio of the high osmotic pressure substance and the water soluble thickening agent is in a range of from 100:0.5 to 100:5.

3. A device as set forth in claim 1, wherein the water soluble thickening agent is selected from the group consisting of natural polysaccharides and their derivatives such as alginic acid, sodium alginate, an alginic acid-propylene glycol ester, mannan, starch, a starch-sodium phosphate, carrageenan, gluten, guar gum, gum arabic, tragacanth gum, locust bean gum, starch-sodium glycolate and cellulose-sodium glycolate; natural proteins such as casein and sodium casein; and synthetic polymers such as sodium polyacrylate, methyl cellulose, sodium carboxymethyl cellulose, polyvinyl alcohol, polyethylene oxide and carboxymethyl cellulose.

4. A device as set forth in claim 1, wherein the hardness of the interior is in a viscosity range of 100–500 poises.

5. A device as set forth in claim 1, wherein the water-permeable semipermeable membrane is selected from the group consisting of ordinary cellophane, low oriented vinylon films, collodion membranes, ethylene-vinyl acetate copolymer films and low oriented nylon films.

6. A device as set forth in claim 5, wherein the high osmotic pressure substance is selected from the group consisting of thick malt syrup, aqueous solutions of sucrose, isomerized sugars, pullulan, glucose, fructose, mannitol, sorbitol and margetol, glycerin, and propylene glycol.

7. A device as set forth in claim 1, further comprising a humidifier.

8. A device as set forth in claim 7, wherein the humidifier is selected from the group consisting of hydrophilic alcohols such as glycerin and propylene glycol.

9. A device as set forth in claim 1, further comprising a bacteriostatic substance.

10. A device as set forth in claim 9, wherein the bacteriostatic substance is selected from the group consisting of ethanol, egg albumen lysozyme, amino acids and organic acids.

* * * * *